US010444407B2

(12) United States Patent
Hongo et al.

(10) Patent No.: US 10,444,407 B2
(45) Date of Patent: Oct. 15, 2019

(54) OPTICAL ELEMENT INCLUDING A PLURALITY OF CONCAVITIES

(71) Applicant: Oji Holdings Corporation, Tokyo (JP)

(72) Inventors: Koki Hongo, Tokyo (JP); Kei Shinotsuka, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 277 days.

(21) Appl. No.: 15/516,486

(22) PCT Filed: Oct. 21, 2015

(86) PCT No.: PCT/JP2015/079709
§ 371 (c)(1),
(2) Date: Apr. 3, 2017

(87) PCT Pub. No.: WO2016/063915
PCT Pub. Date: Apr. 28, 2016

(65) Prior Publication Data
US 2017/0307783 A1    Oct. 26, 2017

(30) Foreign Application Priority Data

Oct. 24, 2014  (JP) ................. 2014-217151
Oct. 29, 2014  (JP) ................. 2014-220231
(Continued)

(51) Int. Cl.
*G02B 27/00* (2006.01)
*G02B 1/118* (2015.01)
*G02B 1/14* (2015.01)

(52) U.S. Cl.
CPC ............... *G02B 1/118* (2013.01); *G02B 1/14* (2015.01)

(58) Field of Classification Search
CPC .. G02B 1/10; G02B 1/11; G02B 1/111; G02B 1/113; G02B 1/115; G02B 1/118;
(Continued)

(56) References Cited

U.S. PATENT DOCUMENTS

2012/0147472 A1  6/2012  Kajiya et al.
2013/0280489 A1  10/2013  Nakai et al.
(Continued)

FOREIGN PATENT DOCUMENTS

JP    A-2008-090212    4/2008
JP    A-2011-227387    11/2011
(Continued)

OTHER PUBLICATIONS

English translation of JP 2008-090212 A. (Year: 2019).*
(Continued)

*Primary Examiner* — Arnel C Lavarias
(74) *Attorney, Agent, or Firm* — Knobbe, Martens, Olson & Bear LLP (57) ABSTRACT

An optical element having, on one surface thereof, multiple recessed sections arranged at a most frequent pitch equal to or less than the wavelength of light in the operating environment, the optical element having, when seen in plan view, multiple domains in which the multiple recessed sections are aligned in a predetermined arrangement, and, multiple protruding sections formed in a region sandwiched between the multiple domains and/or in a region surrounded by the multiple recessed sections inside the domains, the multiple protruding sections accounting for a surface area ratio of 1%-15% as seen in plan view.

10 Claims, 4 Drawing Sheets

(30) Foreign Application Priority Data

Oct. 29, 2014 (JP) .................................. 2014-220232
May 19, 2015 (JP) .................................. 2015-101968

(58) Field of Classification Search
CPC .............. G02B 5/18; G02B 2005/1804; G02B 5/1809; G02B 5/1866; G02B 5/1871; G02B 27/42; G02B 27/4233; G02B 27/44
USPC ........ 359/558, 566, 569, 574, 575, 576, 577
See application file for complete search history.

(56) References Cited

U.S. PATENT DOCUMENTS

2015/0273792 A1* 10/2015 Tazawa .................... C09J 7/385
428/142
2015/0301230 A1* 10/2015 Dai ........................ B29C 33/38
359/601

FOREIGN PATENT DOCUMENTS

| JP | A-2012-242803 | 12/2012 |
| JP | A-2014-066975 | 4/2014 |
| JP | A-2014-077040 | 5/2014 |
| WO | WO 2012/091012 A1 | 7/2012 |
| WO | WO 2014/092132 A1 | 6/2014 |
| WO | WO 2014/123193 A1 | 8/2014 |

OTHER PUBLICATIONS

Deak et al., "Nanostructured silica Langmuir-Blodgett films with antireflective properties prepared on glass substrates", Thin Solid Films, Elsevier, Amsterdam, NL, vol. 484, No. 1-2, Jul. 22, 2005, pp. 310-317.
Search Report in European Patent Application No. 15852135.1, dated May 7, 2018.
International Search Report in in International Application No. PCT/JP2015/079709, dated Jan. 26, 2016.

* cited by examiner

OPTICAL ELEMENT INCLUDING A PLURALITY OF CONCAVITIES

TECHNICAL FIELD

The present invention relates to an optical element, an optical composite element and an optical composite element having a protective film.

The present application claims priority to Japanese Patent Application No. 2014-217151, filed on Oct. 24, 2014, Japanese Patent Application No. 2014-220231, filed on Oct. 29, 2014, Japanese Patent Application No. 2014-220232, filed on Oct. 29, 2014, and Japanese Patent Application No. 2015-101968, filed on May 19, 2015, the contents of which are incorporated by reference herein.

BACKGROUND ART

Often, a film-like anti-reflection structure for improving visibility is provided on the surface of a display, for example, a computer. A method for preventing reflection by closely disposing a plurality of fine prominent convex protrusions on the surface of a transparent substrate (transparent film) has been proposed as this anti-reflection structure. The so-called "moth-eye structure" principle is applied in this method. Moth-eye structures seek to prevent reflection by continuously varying the refractive index with respect to incident light in the thickness direction of the substrate, thereby eliminating a discontinuous interfaces of the refractive index.

Such an anti-reflection structure can realize high anti-reflective performance, provided that the refractive index with respect to incident light can be continuously varied. As such, in principle, anti-reflection structures are not limited to fine prominent convex protrusions and may also be a structure that is configured with fine concavities.

Anti-reflective performance of an anti-reflective structure may be superior if refractive index change is more gradual. Therefore, it is preferable that a ratio of height or depth of the fine prominent convex protrusions or concavities to a width of the structure (hereinafter referred to as the "aspect ratio") be high.

On the other hand, with higher aspect ratios, a fine convexity or concavity is structurally fragile, leading to difficulty in maintaining the shape of the structure. There is also a problem in that higher aspect ratios lead to increased complications when fabricating the structure. For example, these types of fine shapes can be fabricated by nanoimprinting or other methods in which a mold is used. However, there is a problem in that, when the aspect ratio is high, the mold becomes clogged with resin or the like when transferring the prominent convex protrusions or concavities from the mold.

As such, many lines of research are being pursued to obtain high anti-reflective performance without increasing the aspect ratio.

In Patent Document 1, it is described that strong coloration in reflection may be reduced while a ratio of high aspect prominent convex protrusions within a concavo-convex structure can be reduced by imparting a certain degree of variation to the height of prominent convex protrusions of the concavo-convex structure.

Additional problem for an anti-reflective structural body having fine prominent convex protrusions and concavities is deposition of a fine foreign object between the prominent convex protrusions or in the concavities, which may impair the anti-reflective effect.

Patent Document 2 describes a structural body having fine concavities and prominent convex protrusions resistant to water deposits achieved by large water contact angle of 140° or greater at a surface of the fine concavities and prominent convex protrusions.

CITATION LIST

Patent Literature

Patent Document 1: Japanese Unexamined Patent Application Publication No. 2014-066975A
Patent Document 2: Japanese Unexamined Patent Application Publication No. 2014-077040A

SUMMARY OF INVENTION

Technical Problem

For example, for an optical element described in Patent Document 1, a concavo-convex structure with size variation is prepared so that the height of the prominent convex protrusions has a certain degree of distribution. The concavo-convex structure with size variation results in randomness in pitches between concavities and prominent convex protrusions, which poses difficulties in enhancing optical transparency in the desired wavelength. Also, there is no sufficient countermeasure against stain in the optical element described in Patent Document 1. Stain deposition cannot be prevented in such an optical element.

For the optical element described in Patent Document 2, although it is effective against water-soluble stains such as contaminated water, it is not effective against oily or fatty stains such as human sebum or hand cream. Also, the anti-reflective performance is not satisfactory.

In light of these problems, an object of the present invention is to provide an optical element with high anti-reflective performance and antifouling performance.

Solution to Problem

The present inventors conducted diligent research to discover an optical element that has excellent anti-reflective performance and antifouling performance by forming a plurality of concavities and prominent convex protrusions protruding in the opposite direction.

The present invention includes the following inventions:

1. An optical element according to an aspect of the present invention, including a plurality of concavities arranged at a modal pitch not greater than a wavelength of light under a usage environment on one side of the optical element, wherein the optical element includes two or more domains in a planar view, each of the domains including a predetermined arrangement of the plurality of concavities, a plurality of prominent convex protrusions are formed in at least one region selected from the group consisting of a region surrounded by a plurality of the domain and a region surrounded by the plurality of concavities in the domain, and an area ratio of the plurality of concavities in a planar view is from 1% to 15%.

2. The optical element described in 1 above, may be an optical element, in which a modal height of the plurality of prominent convex protrusions is not less than 0.2 times and not greater than 0.8 times a modal depth of the plurality of concavities.

3. The optical element described in 1 and/or 2 above, may be an optical element, in which a number of concavities adjacent to any of the plurality of prominent convex protrusions is not less than 10% and not greater than 80% of a total number of the plurality of concavities.

4. The optical element described in any one of 1 to 3 above, may be an optical element, in which the plurality of prominent convex protrusions include a merged prominence wherein the prominent convex protrusions adjacent to each other are partially merged together.

5. In the optical element described in any one of 1 to 4 above, the domain may be randomly arranged in a planar view.

6. An optical composite element according to an aspect of the present invention including the optical element described in any one of 1 to 5 above, and a first coating layer on a side of the optical element on which the plurality of concavities and the plurality of prominent convex protrusions are formed, the first coating layer emulating a morphology of the plurality of concavities and the plurality of prominent convex protrusions.

7. An optical composite element according to an aspect of the present invention including the optical element described in any one of 1 to 5 above, and a second coating layer on a side of the optical element on which the plurality of concavities and the plurality of prominent convex protrusions are formed, the second coating layer covering a whole morphology of the plurality of concavities and the plurality of prominent convex protrusions.

8. An optical composite element according to an aspect of the present invention including the optical element described in any one of 1 to 5 above, and a protective film in contact with the plurality of prominent convex protrusions, on a side of the optical element on which the plurality of concavities and the plurality of prominent convex protrusions are formed.

9. An optical composite element having a protective film according to an aspect of the present invention including the optical composite element described in 6 above and a protective film in contact with a part covering the prominent convex protrusions in the first coating layer of the optical composite element.

Advantageous Effects of Invention

An optical element according to an aspect of the present invention has excellent anti-reflective performance and anti-fouling performance by forming a plurality of concavities and prominent convex protrusions protruding in the opposite direction.

DESCRIPTION OF EMBODIMENTS

Optical Element, Optical Composite Element

Figure 1:
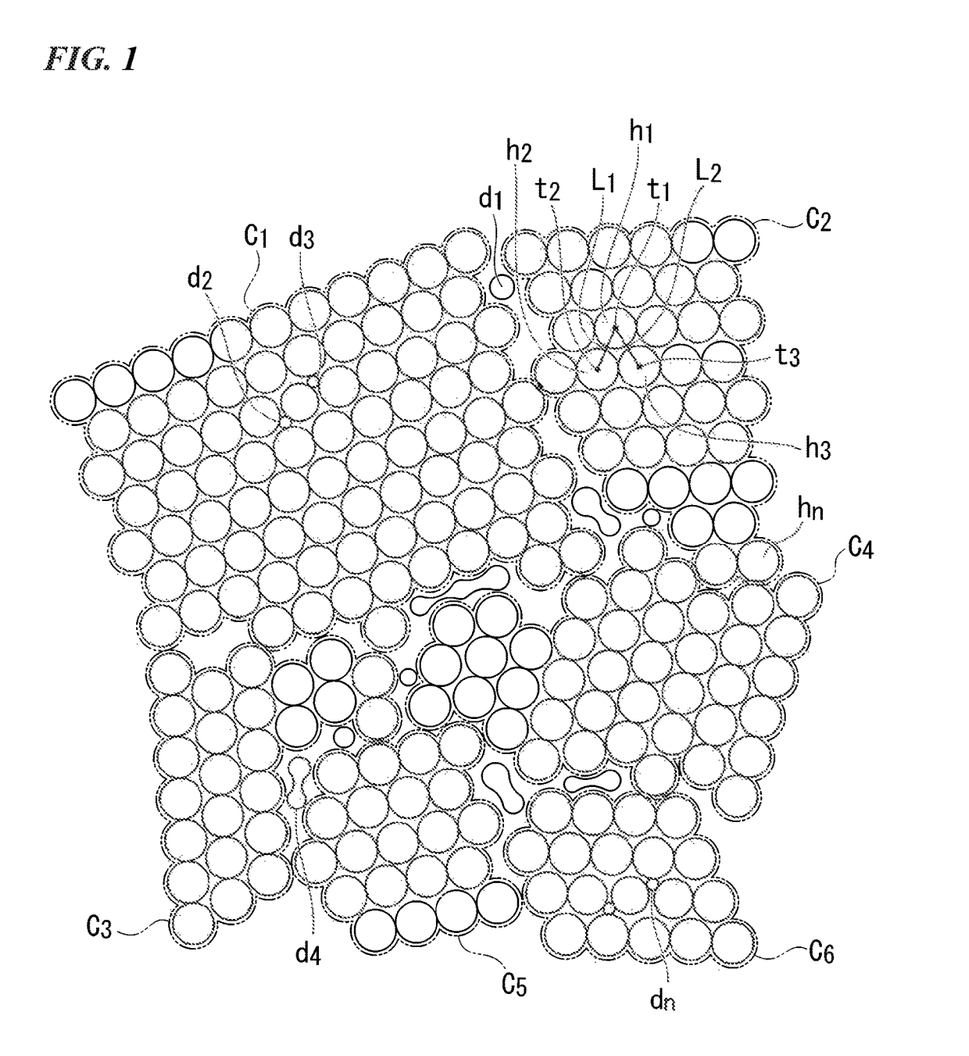
FIG. 1 is a plan view schematically illustrating an optical element according to an aspect of the present invention.

FIG. 1 is a plan view schematically illustrating the optical element according to an aspect of the present invention.

A plurality of concavities h1 to hn are formed on one side of the optical element 1. The plurality of concavities h1 to hn is grouped into a plurality of domains $C_1$ to $C_n$ in a planar view. In a part of a region surrounded by the plurality of domains $C_1$ to $C_n$ and/or in a part of a region surrounded by the plurality of concavities h1 to hn in the domain, a plurality of prominent convex protrusions d1 to do is formed.

In the optical element 1, the lattice orientations of the concavities h1 to hn are ordered within each area $C_1$ to $C_n$, but, are not ordered macroscopically. Therefore, the optical element 1 has a structure resembling a polycrystalline structural body.

The plurality of the concavities h1 to hn are arranged in a predetermined arrangement in each domain $C_1$ to $C_n$. The predetermined arrangement is preferably a triangular mesh pattern as illustrated in FIG. 1. If the concavities h1 to hn are arranged in a triangular mesh pattern, arrangement density of the concavities h1 to hn is high and can achieve superior anti-reflective performance. The triangular mesh pattern is a pattern in which central points of three adjacent concavities are arranged in a positional relationship of forming three corners of a substantially equilateral triangle.

Specifically, "the positional relationship of forming three corners of a substantially equilateral triangle" means a relationship that satisfies the following conditions. First, a line segment L1 of a length equal to the modal pitch P is drawn from one central point t1 of a concavity h1 toward an adjacent central point t2 of adjacent concavity h2. Then, a line segment L2 of the length equal to the modal pitch P is drawn from the central point t1 in directions 60° with respect to the line segment L1. If the central point t3 of another concavity h3 is located within a range not greater than 15% of the modal pitch P from the end point of the line segment L2, then these three central points are said to be in "the positional relationship of forming three corners of a substantially equilateral triangle".

The central points t1 to tn of each of the concavities h1 to hn can be determined as follows.

The center of gravity of each contour line (point determined by an X-coordinate and a Y-coordinate) is found by drawing a plurality of contour lines parallel to a reference plane (slope-corrected) for each of the concavities h1 to hn at 20 nm intervals, on the basis of the result of measurements by an AFM (atomic force microscope). An average position of the centers of gravity (place determined by the average of the X-coordinates and the average of the Y-coordinates) is the central points t1 to tn of the concavities h1 to hn.

The modal pitch P is a distance between adjacent concavities and, specifically, can be determined as follows.

First, in a randomly selected region on the optical element 1, an AFM image is obtained for a square region of which one side thereof is from 30 to 40 times the modal pitch P. For example, in a case where the modal pitch P is about 300 nm, an image of a 9 μm×9 μm to 12 μm×12 μm region is obtained. Then, this image is subjected to waveform separation by Fourier transformation to obtain a fast Fourier transform image (FFT image). Next, the distance from the zero-order peak to the first-order peak in the profile of the FFT image is determined.

The reciprocal of the distance thus determined is the modal pitch P in that region. This process is performed in the same manner for not less than a total of 25 randomly selected regions of the same area, and the modal pitch in each region is determined. The average of the modal pitches $P_1$ to $P_{25}$ of not less than 25 regions obtained in this manner is the modal pitch P. Note that, at this time, it is preferable that regions that are at least 1 mm apart are selected, and it is more preferable that regions that are from 5 mm to 1 cm apart from each other are selected.

The modal pitch of the concavities h1 to hn is not greater than a wavelength of light under a usage environment. In the case where the visible light is used, the modal pitch is preferably from 50 nm to 300 nm. If the modal pitch is not smaller than 50 nm, the pattern can be easily formed by injection molding or nanoimprinting. If the modal pitch is not greater than 300 nm, superior anti-reflective performance can be achieved.

A modal area Q of each of the domains $C_1$ to $C_n$ (the mode of the area size) is preferably in the following range.

When the modal pitch P is less than 500 nm, the modal area Q within a 10 μm×10 μm AFM image measurement range is preferably from 0.026 μm² to 6.5 μm².

When the modal pitch P is not less than 500 nm and less than 1 μm, the modal area Q within a 10 μm×10 μm AFM image measurement range is preferably from 0.65 μm² to 26 μm².

When the modal pitch P is not less than 1 μm, the modal area Q within a 50 μm×50 μm AFM image measurement range is preferably from 2.6 μm² to 650 μm².

When the modal area Q is within the preferred range, it is easier to prevent the problem of viewing angle dependence on anti-reflective performance.

More specifically, the number of concavities h1 to hn arranged in each of the domains $C_1$ to $C_n$ is preferably from 3 to 1000 and more preferably from 7 to 500.

Each of the domains $C_1$ to $C_n$ may be the same predetermined shape or a different shape. From the viewpoint of suppressing occurrence of an interference fringe and the like, it is preferable that each of the domains $C_1$ to $C_n$ to be a different shape.

As illustrated in FIG. 1, an area, a shape, and a lattice orientation of each of the domains $C_1$ to $C_n$ are preferably arranged in random. Specifically, the degree of randomness of the area preferably satisfies the following conditions.

First, an ellipse of the maximum area circumscribed by the boundary line of one domain is drawn, and that ellipse is represented by Equation (1) below:

$$X^2/a^2 + Y^2/b^2 = 1 \quad (1)$$

When the modal pitch P is less than 500 nm, the standard deviation of nab within a 10 μm×10 μm AFM image measurement range is preferably not less than 0.08 μm².

When the modal pitch P is not less than 500 nm and less than 1 μm, the standard deviation of nab within a 10 μm×10 μm AFM image measurement range is preferably not less than 1.95 μm².

When the modal pitch P is not less than 1 μm, the standard deviation of nab within a 50 μm×50 μm AFM image measurement range is preferably not less than 8.58 μm².

When the standard deviation of nab is within the preferred range, it is easier to prevent the problem of viewing angle dependence on anti-reflective performance.

As for the degree of randomness of shape of each of the domains $C_1$ to $C_n$, specifically, the standard deviation of the ratio of a to b (a/b) in Equation (1) above is preferably not less than 0.1.

Figure 2:
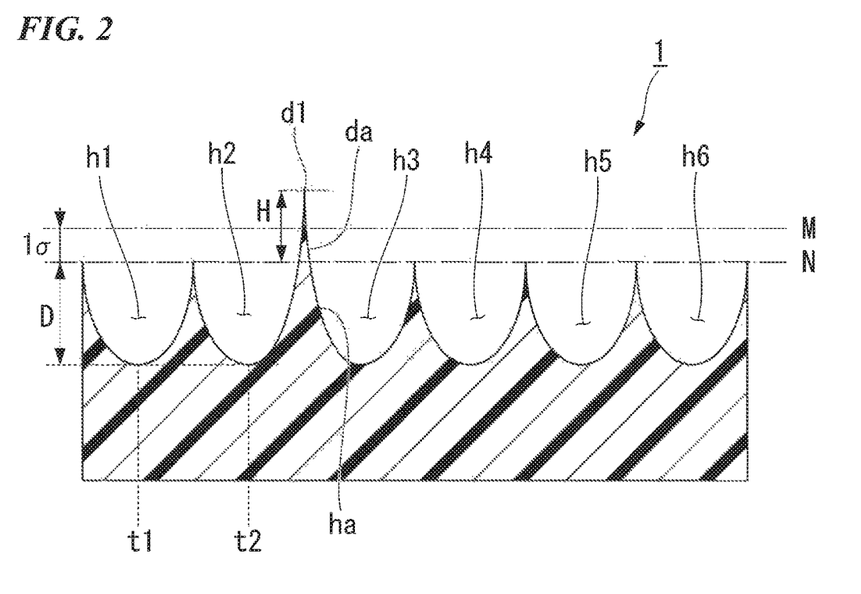
FIG. 2 is a cross-sectional view schematically illustrating an optical element according to an aspect of the present invention, along the straight line connecting the deepest points of the adjacent concavities.

The arrangement of the concavities h1 to hn, and the arrangement of the domains $C_1$ to $C_n$ according to the arrangement of concavities h1 to hn have been described so far. The definition of the concavities h1 to hn will be described using a cross-sectional schematic view in FIG. 2. Also, the prominent convex protrusions d1 to dn described later will be explained. FIG. 2 is a cross-sectional view schematically illustrating an optical element according to an aspect of the present invention, along the straight line connecting the central points of any adjacent concavities.

The concavities h1 to hn are cavities formed in the downward direction in the figure from the reference plane N. The reference plane N is a plane that is parallel to the reference plane obtained by slope correction in AFM data and a plane at the position of modal surface height of the concavities obtained in AFM data.

Height positions obtained in AFM data are described below. The height information of the concavities obtained from AFM data includes a modal bottom height and a modal surface height.

The modal bottom height and the modal surface height are obtained as follows. First, a cross-section intersecting central points of two discretionarily selected adjacent concavities is determined from AFM data. From the cross-section of AFM data, the local height of the deepest points of the two concavities and the local height of the highest point of the convexity between the two concavities are obtained. The similar procedure is performed for 25 locations discretionarily selected. After this procedure, the local height for the deepest points of the concavities are obtained for 50 locations and the local height for the highest points of the prominent convex protrusions are obtained for 25 locations. The local height obtained is plotted as a histogram, and fitted with a Gaussian function. Thus, modal local height of the deepest points of the concavities and the modal local height of the highest points of the prominent convex protrusions can be obtained. The modal local height of the deepest points of the concavities is the modal bottom height and the modal local height of the highest points of the prominent convex protrusions is the modal surface height.

The modal depth of the concavities h1 to hn is also determined in the same manner. From the cross-section of AFM data, a difference between the local height of the deepest points of the two concavities and the local height of the highest point of the convexity between the two concavities (the depth of concavities) is measured. The similar procedure is performed for 25 locations discretionarily selected and the local height is plotted as a histogram and fitted with a Gaussian function. Gaussian function fitting gives the modal depth D of the concavities. The fitting also gives a standard deviation 1σ of the depths of the concavities at the same time.

The modal depth of the concavities h1 to hn is preferably from 100 to 500 nm. If the modal depth is not greater than 500 nm, failure in transfer is unlikely to occur during injection molding or nanoimprinting and pattern can be formed easily. If the modal pitch is not less than 100 nm, superior anti-reflective performance can be achieved.

The standard deviation 1σ of the depths of the concavities corresponds to a coefficient of variation of the depths of the concavities. The coefficient of variation is preferably less than 8% and more preferably less than 5%. If the coefficient of variation is within this range, a gap is unlikely to form when filling a material into a mold during injection molding or nanoimprinting.

The prominent convex protrusions d1 to dn are defined as follows. A prescribed plane M is defined by translating the reference plane N in the direction away from the optical element 1 by the standard deviation 1σ of the depths of the concavities. If a part of the optical element 1 is protruding from the prescribed plane M, the prominent convex protrusions d1 to dn are defined as parts protruding from the reference plane N at the respective positions in the opposite side to the concavities h1 to hn with regard to the reference plane N. That is, the prominent convex protrusions have heights not less than the standard deviation 1σ of the concavities from the reference plane N.

The modal height H of the prominent convex protrusions d1 to dn is preferably not less than 0.2 times and not greater than 0.8 times, more preferably not less than 0.3 times and not greater than 0.5 times the modal depth of the concavities h1 to hn.

The modal height of the prominent convex protrusions d1 to dn refers to a modal value of the height H, from the reference plane N to the apexes of the prominent convex protrusions d1 to dn. The modal height H of the prominent convex protrusions d1 to dn can be obtained by measuring the heights of the prominent convex protrusions d1 to dn at 25 discretionary locations and determining the modal value thereof. The prominent convex protrusions d1 to dn at discretionarily selected 25 locations may be discretionarily selected from multiple AFM images obtained for a square region of which one side thereof is from 30 to 40 times the modal pitch P.

If the modal height H of the prominent convex protrusions d1 to dn is within this range, an optical element having high anti-scratch performance and anti-reflective performance can be obtained. If the modal height H of the prominent convex protrusions d1 to dn is not less than the predetermined height, the refractive index can be changed stepwise and the anti-reflective performance can be enhanced. If the modal height H of the prominent convex protrusions d1 to dn is not greater than the predetermined height, aspect ratios of the prominent convex protrusions d1 to dn can be controlled to be not too high and the anti-scratch performance can be enhanced.

The cross-sectional area of each of the prominent convex protrusions d1 to dn is preferably reduced continuously or in stepwise manner as the convexity protrudes to the opposite side of the concavities h1 to hn. In addition, in a cross-sectional view, a profile da of each of the prominent convex protrusions d1 to dn is preferably continuous with an slope ha that configures each of the concavities h1 to hn. "Being continuous" herein means that there is no kink or the like at the slope at a connection part between the profile da of each of the prominent convex protrusions d1 to dn and the slope ha of each of the concavities h1 to hn. Specifically, "being continuous" means that a tangent exists at the connection part in the cross-sectional view.

For the shapes of the concavities h1 to hn, at a cross-section parallel to the reference plane N, an area ratio of the optical element 1 at the cross-section preferably increases continuously or in a stepwise manner as the cross-section moves toward the bottom of the concavities h1 to hn. In other words, the sizes of the spaces that form the concavities preferably becomes smaller continuously or in a stepwise manner toward the bottom of the concavities. Specific examples of the shapes of the concavities include a pyramid, a frustum, a hemisphere, a spindle and a combination thereof.

Back in FIG. 1, the prominent convex protrusions d1 to dn exist in parts of grain boundaries of domains $C_1$ to $C_n$ and/or regions surrounded by a plurality of concavities h1 to hn within each of the domains $C_1$ to $C_n$ in a planar view.

For example, if a convexity exists in a grain boundary of the domains $C_1$ to $C_n$, the convexity is likely to be surrounded by four or more concavities. In this case, the adjacent prominent convex protrusions may be joined together as illustrated in reference sign d4. Hereinafter, such joined prominent convex protrusions are referred to as a merged prominence d4.

The merged prominence d4 is structurally strong because the adjacent prominent convex protrusions are joined together. Therefore, anti-scratch performance of the optical element 1 can be enhanced by the presence of the mountain-range shaped prominent convex protrusions 4. The breakage or the like during production can be suppressed as well.

The convexity present in the region surrounded by a plurality of the concavities h1 to hn within each of the domains $C_1$ to $C_n$ is often surrounded by three or more concavities. This is because a convexity formed in the domain is often formed by local disorder of the arrangement of concavities. A convexity formed in such a part often exists independently as illustrated by reference signs d2 and d3, and has a shape of a cone. A shape of a cone may be a circular cone, a trigonal pyramid, a quadrangular pyramid, a hexagonal pyramid or the like.

The area ratio that the prominent convex protrusions d1 to dn occupy in the planar view is preferably from 1% to 15% and more preferably from 5% to 10%.

A part where the arrangement of the concavities h1 to hn is out of order becomes a grain boundary. In the grain boundary, a concavo-convex shape that is supposed to produce a continuous refractive index change is in disorder. Thus, the grain boundary may cause a reflection. However, if the prominent convex protrusions d1 to dn are disposed in the region, anti-reflective performance can be enhanced. Also, because the prominent convex protrusions d1 to dn are not present over the whole surface, the deposition of stains on the surface of the optical element 1 can be suppressed. In general, a size of the stain deposited on an optical element surface is larger compared to the sizes of the concavities h1 to hn. That is, a stain deposited on the optical element surface having the prominent convex protrusions d1 to dn may be supported by apexes of the standing prominent convex protrusions d1 to dn, and is not deposited on the whole surface of the optical element. Thus, a contact area between the stain and the optical element 1 can be reduced and the stain is easily removed.

The area ratio of the prominent convex protrusions d1 to dn in the planar view is the area ratio of the prominent convex protrusions d1 to dn at the reference plane N. Specifically, the area ratio can be obtained as follows.

First, in a randomly selected region on the optical element 1, an AFM image is obtained for a square region of which one side thereof is from 30 to 40 times the modal pitch P. The prominent convex protrusions d1 to dn are extracted from the obtained AFM images. The area of the extracted prominent convex protrusions d1 to dn at the flat surface N is determined and divided by the whole area. Thus, the area ratio of the prominent convex protrusions d1 to dn is calculated.

In addition, the number of the concavities h1 to hn which are adjacent to the plurality of the prominent convex protrusions d1 to dn is preferably not less than 10% and less than 80% and more preferably not less than 20% and not greater than 70%, relative to the total number of the plurality of the concavities.

If appearance frequency of the prominent convex protrusions is within this range, an optical element having high anti-scratch performance and anti-reflective performance can be obtained. For example, it is possible to avoid the pitch of the prominent convex protrusions to be not less than a wavelength of light under a usage environment schematically by joining the prominent convex protrusions together. Thus, the degradation of the antireflective performance can be avoided. Also, in the case of production of the optical element 1 by transfer such as injection molding and nanoimprinting, superior release characteristic can facilitate the production.

Furthermore, a larger number of the concavities h1 to hn adjacent to the prominent convex protrusions d1 to dn means the prominent convex protrusions d1 to dn are isolated from each other over the whole area. Thus, the deposited stain can be supported on the apexes of the prominent convex protrusions d1 to dn in any part, and thereby superior antifouling performance can be enhanced.

Note that whether the concavities are adjacent to the prominent convex protrusions is judged as follows. In a planar view, a line is drawn at a distance equal to the modal pitch of the concavities from the circumference of the convexity at the reference plane N, to form a certain range. If a central point of a concavity is present within this range, the concavity is considered to be adjacent to the convexity.

The total number of the concavities h1 to hn is determined as follows. In a randomly selected location on the optical element 1, an AFM image is obtained for a square region of which one side thereof is from 30 to 40 times the modal pitch P. The AFM images are obtained for 25 locations. The number of the concavities h1 to hn within each AFM image is counted and the average is obtained. For the number of the concavities h1 to hn adjacent to the prominent convex protrusions, the number of the concavities h1 to hn adjacent to the prominent convex protrusions d1 to dn is counted for each AFM image, and the average is obtained.

The material of the optical element 1 is not particularly limited. The material may be an organic or inorganic material. Examples of organic materials that may be used include generally used UV curable resins, thermoplastic resins, thermosetting resins, and the like. Examples of inorganic materials that can be used include Si, $SiO_2$, SiON, Ni, spin on glass, and the like. Also, an organometallic compound, a metal alkoxide compound or an oxide thereof can be used.

Alternatively, the optical element 1 may not be provided alone. An optical composite element, in which the optical element 1 is provided with other material(s) or layer(s), can be provided.

Examples of the optical composite element include an optical element provided with a substrate on the side of the optical element 1 opposite to the side on which the concavities h1 to hn are formed. The substrate can be of any form, such as a film, a sheet, a plate, a block, or a lens, and can be selected according to the application.

The material of the substrate is not particularly limited. Examples include synthetic resins such as polyethylene terephthalate (PET), triacetyl cellulose (TAC), polycarbonate (PC), and acrylic resin; and inorganic films such as glass and semiconductors may be used. Polycarbonate has an advantage of highly heat resistant. On the other hand, polycarbonate does not possess good processability as the other materials. Therefore, other materials can be used in the case where the same material as the optical element is used for the substrate.

It is preferable for the refractive index difference between the substrate and the optical element to be small. Specifically, the refractive index difference of 0.1 or smaller is preferable and no refractive index difference (the same material is used for the substrate and the optical element) is more preferable. If there is a large refractive index difference, an intermediate layer that has a refractive index between that of the substrate and that of the optical element can be interposed between the substrate and the optical element. The intermediate layer may be a multilayer structure that is configured to have a stepwise change in refractive index, or the intermediate layer may serve as a bonding layer or an adhesive layer.

On the side of the substrate opposite to the side on which the optical element 1 is formed, other anti-reflective treatment such as AR treatment or AG treatment may be applied. AR treatment is a method to suppress reflection using interference among lights reflected at the interface of the treatment layers. For example, the AR treatment can be applied by laminating multiple layers having different refractive index on one side of the substrate, using methods including dry-coating such as vapor deposition and sputtering and wet-coating. AG treatment is a method to suppress reflection using scattering. For example, AG treatment can be applied by coating a layer containing fine particles on one side of the substrate or increasing the surface roughness of one side of the substrate. In addition to the anti-reflective treatment, anti-microbacterial coating treatment and anti-fouling treatment, and the like may be applied.

The optical composite element, in which another anti-reflective treatment is applied on the side opposite to the side in which the optical element 1 is provided, can be used as a transparent protective member that protects a surface of a display device, for example. Specifically, a transparent protective member can be disposed on a viewing side of a display in one aspect.

If the transparent protective member is disposed on the viewing side of the display device, stains are less likely to develop on the side of the transparent protective member facing the display device, which is not exposed to the exterior. Stains are likely to develop on the viewing side of the transparent protective member due to sebum from the contact with humans and dust. Therefore, it is preferable that the anti-reflection layer applied by treatments such as AR treatment and AG treatment is provided on the viewing side, and the optical element 1 is provided on the display device side.

Figure 3:
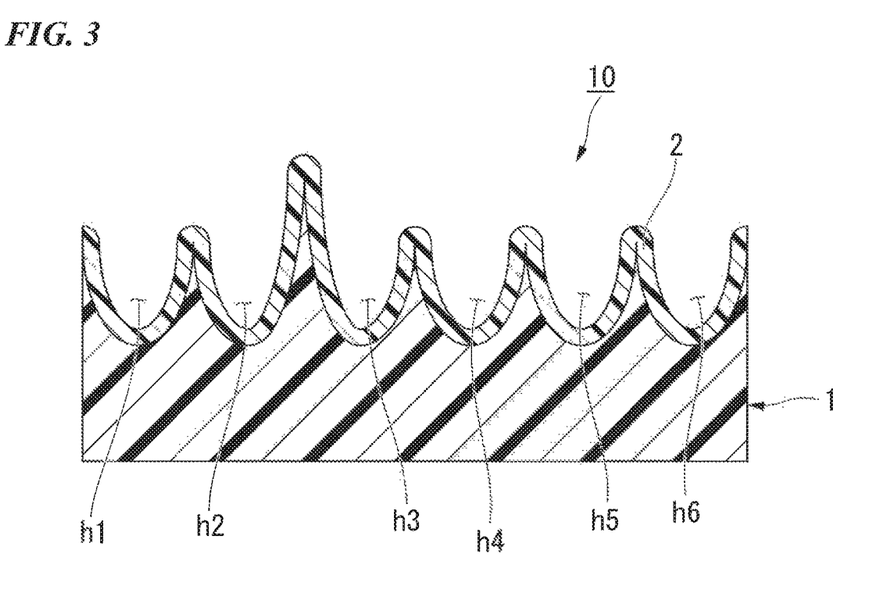
FIG. 3 is a cross-sectional view schematically illustrating an optical composite element according to an aspect of the present invention.

As an alternative example of the optical composite element 10, as illustrated in FIG. 3, a first coating layer 2 may be further provided on the side of the optical element 1, on which the concavities h1 to hn are provided and the first coating layer 2 emulates the morphology of the plurality of the concavities h1 to hn and the plurality of the prominent convex protrusions d1 to dn. The term "emulate" herein does not mean that it is required for the first coating layer 2 to completely reproduce the morphology of the plurality of the concavities h1 to hn and the plurality of the prominent convex protrusions d1 to dn. If the degree of morphology change for the plurality of the concavities h1 to hn and the plurality of the prominent convex protrusions d1 to dn is not greater than 10% in the direction of concavities and prominent convex protrusions extension and not greater than 10% in the plane direction, which is normal to the direction of concavities and prominent convex protrusions extension, the morphology can be referred to as sufficiently "emulated".

The first coating layer 2 may be changed according to the application. For example, the formation of the first coating layer 2 such as a monomolecular layer comprising fluorine can enhance antifouling performance. The monomolecular layer such as fluorine can be obtained by applying and drying a release agent, in which a polymer material containing fluorine atoms is dissolved in a solvent.

Figure 4:
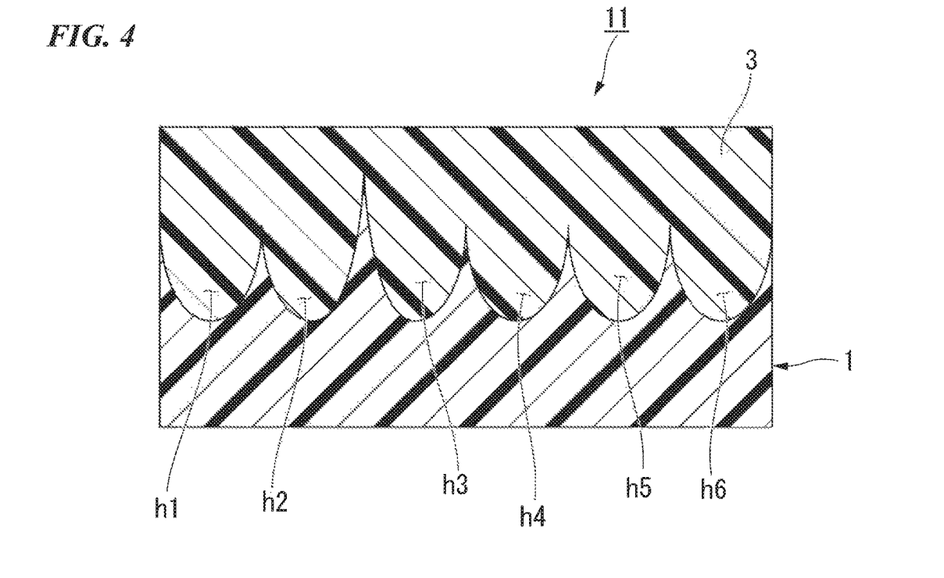
FIG. 4 is a cross-sectional view schematically illustrating an optical composite element according to another aspect of the present invention.

As another alternative example of the optical composite element, the optical composite element 11 may include a second coating layer 3 that fills the concavities h1 to hn of the optical element 1 as illustrated in FIG. 4, for example. As a second coating layer 3, for example, a material of a lower refractive index than that of the optical element 1 can be employed. By filling the concavities with the low refractive index material, antifouling performance and anti-scratch performance can be enhanced compared to the optical element 1 that has a concavo-convex shapes on the surface thereof. The second coating layer 3 can be obtained by applying or pressing the material in low viscosity state on the optical element 1 to fill the concavities, for example.

The optical composite element 11, coated with the second coating layer 3, may be used as a part that configures layers of a solar battery or a light-emitting diode, for example.

Alternatively, a protective film or the like may be disposed, to cover the side of the optical element 1 on which the concavities h1 to hn are formed. By disposing a protective film or the like, scratches or damages on the concavo-convex shapes of the optical element 1 during transportation can be avoided.

The protective film is in contact with apexes of the plurality of the prominent convex protrusions to cover the side of the optical element 1 on which the concavities h1 to hn are formed. In the case where a protective film having an adhesive material on the applying side is applied on the optical element 1, there is a space between concavities h1 to hn of the optical element 1 and the adhesive material maintained by the plurality of the prominent convex protrusions. As a result, reduction in the anti-reflective performance due to adhesive material filling the concavities can be prevented. Alternatively, the protective film can be applied on the concavo-convex side of the optical composite element 10 on which the first coating layer 2 was disposed as illustrated in FIG. 3.

The optical element 1 can be used as an anti-reflective body to be applied to various types of displays (e.g. LCD displays, plasma displays, rear projectors, FEDs, OLEDs, and other FPDs) of a computer, a mobile phone, a digital camera or the like; and the surfaces of show windows and other glass windows, display frames, various display windows, optical lenses, solar batteries, optical materials from which road/traffic signs and signboards are made, and the like. Additionally, this optical element 1 can be used as an original plate of a nanoimprinting mold for manufacturing such an anti-reflective body.

Method for Manufacturing the Optical Element

Next, a method for manufacturing the optical element is described. The optical element according to an aspect of the present invention can be obtained by transferring a mold having a predetermined morphology once or multiple times. The mold can be fabricated by using an etching mask in which a plurality of particles are arranged two-dimensionally on a substrate.

For example, the etching mask can be prepared on a substrate by the Langmuir-Blodgett method (LB method). Specifically, the single-particle film etching mask can be formed on the substrate via a method including a dripping step in which a dispersion having particles dispersed in a solvent is dripped on the surface of liquid in a water tank, a single-particle film formation step in which a single-particle film F made of particles is formed by volatilizing the solvent, and a transfer step in which the single-particle film F is transferred onto the substrate.

First, a dispersion is prepared by adding particles having hydrophobic surfaces to a hydrophobic organic solvent made of one or more types of solvents with high volatility such as chloroform, methanol, ethanol, methyl ethyl ketone, and the like. The dispersion is dropped on the surface of the liquid stored in the tank (dripping step). For this dispersion being dripped on the liquid, the solvent that is the dispersion medium volatilizes and the particles spread in a monolayer form on the surface of the liquid. Thus, a two-dimensionally close-packed single-particle film can be formed (single-particle film formation step).

In dripping step, the dispersion is dripped at multiple locations on the surface of the liquid in the tank. Each of the dispersions which are dripped simultaneously spreads in a monolayer from a location of dripping as a center. As a result, the multiple domains in which particles are arranged in a certain arrangement are formed. Typically, the shapes of the domains are indeterminate.

The domains, which are formed from the multiple locations on the liquid surface at the same time, grow in size and contact with adjacent domains. These domains rarely have the same particle arrangement and have different particle arrangements. As a result, there are gaps among the domains.

The concavities of the optical element correspond to the prominent convex protrusions which are formed on the mold surface by etching the single-particle film. That is, the modal pitch of the concavities, the number of the domains, the areas of domains and the like are influenced by the state of the single-particle film. Thus, the modal pitch of the concavities can be controlled by the average particle size of the particles used. Also, the number of the domains, the areas of the domains, and the like can be controlled by location intervals of the dispersion being dripped simultaneously, the rate of dripping, the time to end the dripping step and the like. By shortening the time from the contact of domains to end of dripping, the appearance frequency of the mountain-range shaped prominent convex protrusions can be increased. By reducing the time interval of dripping, the number of domains increases and the areas of the domains are reduced.

This is followed by the transfer of the formed single-particle film onto the substrate, which is the member to be etched.

The method of transferring the single-particle film to the substrate is not particularly limited. For example, a hydrophobic substrate is held in a position substantially parallel to the single-particle film, and lowered downward to contact the single-particle film. Thus, the single-particle film can be transferred to the substrate by an affinity force between the hydrophobic single-particle film and the substrate.

The single-particle film formed on the substrate functions as a single particle etching mask. The substrate, for which the single particle etching mask is provided on one surface, is subjected to surface processing by gas-phase etching (etching step) so as to form prominent convex protrusions on one surface of the substrate.

Specifically, the etching gas passes through the gaps between the particles configuring the etching mask and reaches the substrate surface. Then, a groove is formed in such an area, a round pillar is realized at the position corresponding to each particle. As the gas-phase etching progresses, the particle on each round pillar is etched as well and reduces its size. Thus, the prominent convex protrusions are formed by continuing the etching further.

These prominent convex protrusions produce the concavities h1 to hn of the optical element 1 by transfer. Therefore, the shapes and the average depth of the concavities h1 to hn of the optical element 1 can be controlled by etching time, the kind of etching gas, the particle material, the substrate material and the combination thereof.

The particle that configures the etching mask is not particularly limited. Examples include gold particles, colloidal silica particles, and the like. A commonly used etching gas may be used. For example, Ar, $SF_6$, $F_2$, $CF_4$, $C_4F_8$, $C_5F_8$, $C_2F_6$, $C_3F_6$, $C_4F_6$, $CHF_3$, $CH_2F_2$, $CH_3F$, $C_3F_8$, $Cl_2$, $CCl_4$, $SiCl_4$, $BCl_2$, $BCl_3$, $BC_2$, $Br_2$, $Br_3$, HBr, $CBrF_3$, HCl, $CH_4$, $NH_3$, $O_2$, $H_2$, $N_2$, CO, $CO_2$ and the like can be used.

The particles and the etching gas may be changed in accordance with the substrate to be etched. For example, in the case of a combination in which gold particles are selected as the particles constituting the etching mask and a glass substrate is selected as the substrate, if an etching gas that reacts with glass such as $CF_4$, $CHF_3$, or the like is used, the etching rate of the gold particles will be relatively slower and the glass substrate will be selectively etched.

The etching mask has a domain. The gaps formed between the domains are larger than the gaps between particles configuring the etching mask. Thus, in the gaps formed between the domains, etching progresses faster than in the gaps between particles configuring the etching mask, and the deeper concavities are formed.

The deep concavity formed in the gaps present between the domains produces the convexity formed in the region between the domains $C_1$ to of the optical element 1 by transfer. The heights of the prominent convex protrusions d1 to do can be controlled primarily by controlling the depths of the concavities by the etching conditions.

For example, changing the composition of the gas during etching can increase the depths of the concavities formed in the gaps between the domains. More specifically, if Si is selected for the original substrate as a mold, the depth of the concavities formed in the gaps between domains may be increased by changing the gas composition from the typical composition of $Cl_2$:$CF_4$=50:50 to the composition of $Cl_2$: $CF_4$:$CHF_3$=50:45:5 to 50:10:40 by adding $CHF_3$.

As described above, the prominent convex protrusions can be formed inside the domains $C_1$ to $C_n$ in addition to the regions between the domains $C_1$ to $C_n$. The heights and appearance frequency of the prominent convex protrusions formed inside the domains $C_1$ to $C_n$ can be controlled by the size variation of the particles configuring the etching mask.

The size variation of the particles configuring the etching mask causes the disturbance in the particle arrangement arranged in the certain domain in the etching mask. Thus, the etching step using the etching mask with such a disturbed arrangement creates the variation in the gap sizes between particles and changes the progress in etching. In the parts where the gap size between the particles is large, the deeper concavities are formed. Such deep concavities produce the prominent convex protrusions d1 to dn formed in the region between the domains $C_1$ to $C_n$ of the optical element 1 by transfer.

To obtain the prominent convex protrusions d1 to dn formed inside the domains $C_1$ to $C_n$, the coefficient of variation (CV value) of the particle size is preferably from 3% to 20% and more preferably from 5% to 10%.

The optical element 1 in which the prominent convex protrusions are formed can be easily obtained by transferring the mold obtained as such once or multiple times.

The heights of the prominent convex protrusions d1 to dn can be controlled by changing the transfer conditions. During transfer, an increase in the filling factor of the molding material in the mold can increase the filling factor of the deeper concavities formed in the mold and increase the height of the prominent convex protrusions formed. During transfer, reduction in the filling factor of the molding material in the mold makes filling of the deeper concavities formed in the mold difficult and can decrease the height of the prominent convex protrusions formed. The filling factor of the molding material in the mold can be controlled by pressure applied, viscosity of the molding material, treatment temperature and the like.

EXAMPLES

The anti-reflective performance of the optical element was confirmed by simulation. First, the simulation method will be described (refer to Applied Optics, Vol. 26, No. 6 1142-1146 (1987), Applied Optics, Vol. 32, No. 7 1154-1167 (1993), and the like).

Reflection when light enters an interface between a material with a refractive index of $n_o$ and a material with a refractive index of $n_s$ will be considered. Here, an article with the refractive index $n_s$ has a concave shape such as that illustrated in FIG. 5.

Figure 5:
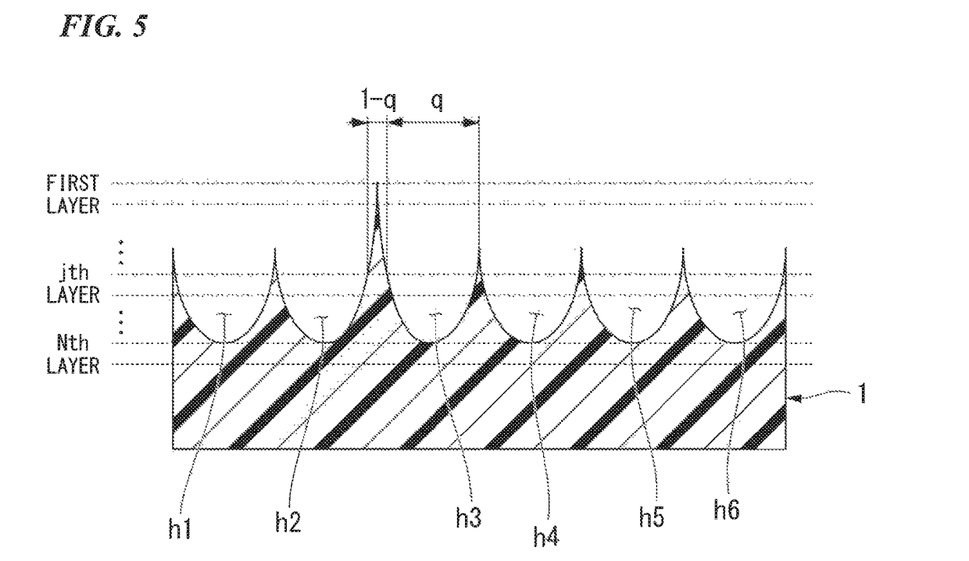
FIG. 5 is a cross-sectional schematic drawing for describing a simulation method.

First, as illustrated in FIG. 5, the anti-reflection layer having the concavities is sliced so as to be divided into N layers from the reference point side, forming a layered structure having a first layer to an Nth layer, in order from the reference point side. The jth layer consists of repetitions of an air region with a width q and an anti-reflection layer region with a width 1-q. The width here is the width of the interface with the j–1th layer. The effective refractive index of the jth layer is $n_j$, and the thickness of this layer is $d_j$. Here, $n_j$ can be found from the refractive indexes $n_o$ and $n_s$, and the width q. Additionally, $d_j$ can be found by dividing the modal depth of the concavities by the number of layers N.

The transfer matrix represented by Equation (2) below is calculated. In the calculation, it is assumed that light of a wavelength λ enters the jth layer at an angle of incidence $\varphi_j$.

[Equation 1]

$$T_j = \begin{bmatrix} \cos\delta_j & (i/\omega_j)\sin\delta_j \\ i\omega_j\sin\delta_j & \cos\delta_j \end{bmatrix} \quad (2)$$

Here, $\delta_j$ and $\omega_j$ are represented by Equation (3) and Equation (4) below.

[Equation 2]

$$\delta_j = (2\pi/\lambda)n_j d_j \cos \phi_j \quad (3)$$

[Equation 3]

$$\omega_j = \begin{cases} n_j\cos\phi_j & (s \text{ polarization}) \\ n_j/\cos\phi_j & (p \text{ polarization}) \end{cases} \quad (4)$$

Following the order in which the light passes through the layers, the multiplying of the transfer matrix of each layer from the left is repeated from the first layer to the Nth layer. This operation can be represented by Equation (5). A, B, C, and D are values of the calculated results.

[Equation 4]

$$\prod_{j1}^{N} T_j = \begin{pmatrix} A & B \\ C & D \end{pmatrix} \quad (5)$$

Using A, B, C, and D that were calculated using the procedure described above, the refractive indexes of the plurality of sliced layers can be represented as follows.

[Equation 5]

$$R = \left| \frac{\omega_0 A + \omega_0 \omega_s B - C - \omega_s D}{\omega_0 A + \omega_0 \omega_s B + C + \omega_s D} \right|^2 \quad (6)$$

Anti-Reflective Performance

Example 1

Figure 6:
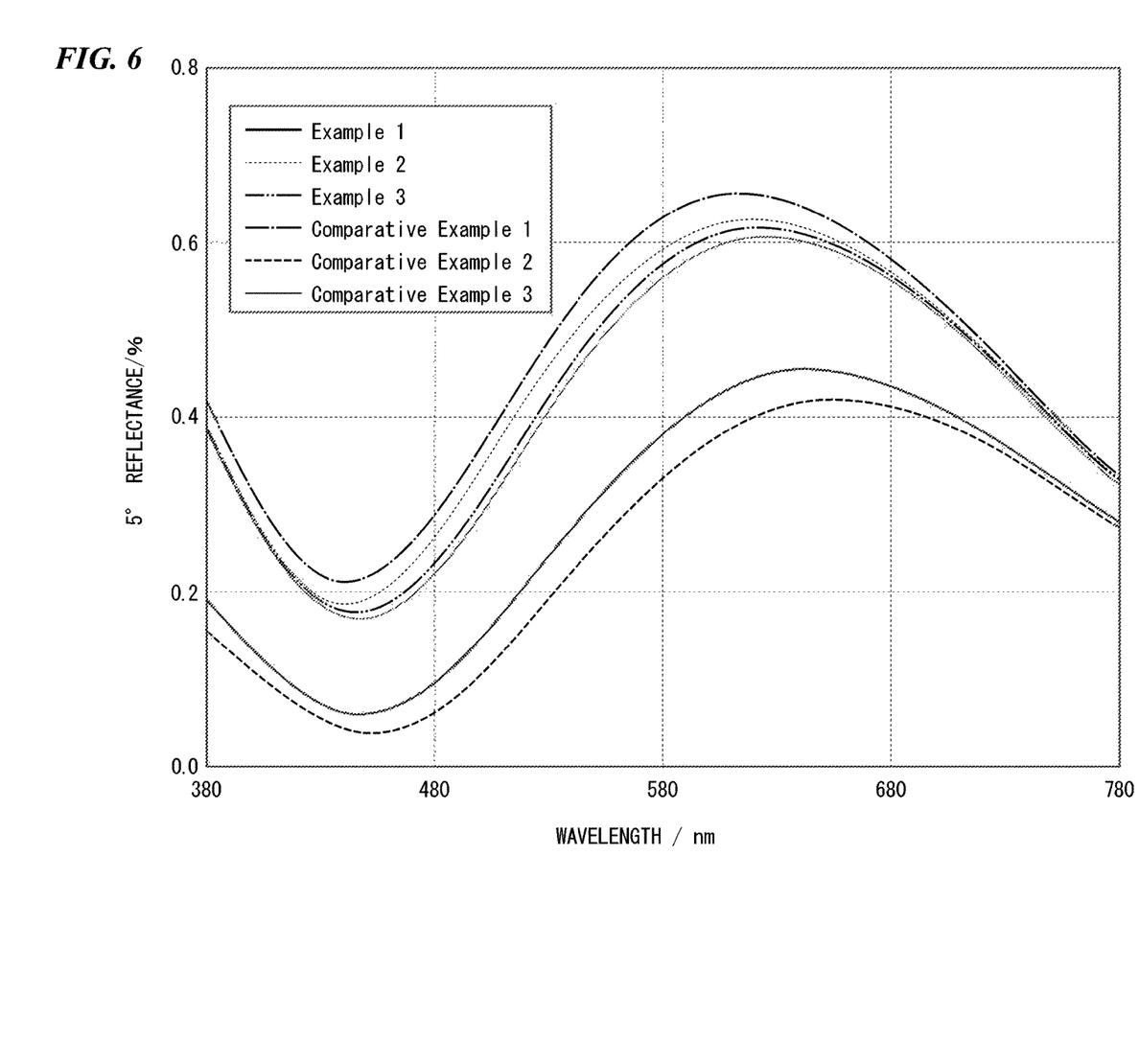
FIG. 6 is a graph showing measurement results of reflectance of the optical elements of Examples 1 to 3 and Comparative Examples 1 to 3.

The reflectance spectrum at 5° was determined by simulation above for the optical element having the prominent convex protrusions. The results are shown in FIG. 6. In this case, the depth of the concavities was 300 nm, the pitch of the concavities was 120 nm, the diameter of the concavities was 100 nm, the height of the prominent convex protrusions was 100 nm, and the area ratio of the prominent convex protrusions was 15%. Light entered an interface with a refractive index of 1.5 from air with a refractive index of 1.0, at an angle of incidence of 5°, and the refractive index of the material of the anti-reflection layer was also 1.5. The depth, the pitch, and the diameter of the concavities, and the height of the prominent convex protrusions were fixed for the simulation, but corresponded to the respective modal values in reality.

Example 2

In Example 2, all the factors were the same as in Example 1 except that the area ratio of the prominent convex protrusions was 2%. The reflectance spectrum at 5° was determined by simulation above for the optical element of Example 2. The results are shown in FIG. 6.

Example 3

In Example 3, all the factors were the same as in Example 1 except that the height of the prominent convex protrusions was 30 nm. The reflectance spectrum at 5° was determined by simulation above for the optical element of Example 3. The results are shown in FIG. 6.

Comparative Example 1

In Comparative Example 1, no convexity was formed. That is, all the factors were the same as in Example 1 except that the area ratio of the prominent convex protrusions was 0%. The reflectance spectrum at 5° was determined by simulation above for the optical element of Comparative Example 1. The results are shown in FIG. 6.

Comparative Example 2

In Comparative Example 2, all the factors were the same as in Example 1 except that the area ratio of the prominent convex protrusions was 18.8%. The reflectance spectrum at 5° was determined by simulation above for the optical element of Comparative Example 2. The results are shown in FIG. 6.

Comparative Example 3

In Comparative Example 3, all the factors were the same as in Example 3 except that the area ratio of the prominent convex protrusions was 18.8%. The reflectance spectrum at 5° was determined by simulation above for the optical element of Comparative Example 3. The results are shown in FIG. 6.

Antifouling Performance

Antifouling performance was tested for Examples 1 to 3 and Comparative Examples 1 to 3. Testing of antifouling performance was conducted as follows.

For Examples 1 to 3 and Comparative Examples 1 to 3, the optical element was transferred to the surface of a polycarbonate plate. Human sebum was deposited on five locations on the structured surface, left for 10 minutes and washed off by ethanol. The state of human sebum residue was observed visually and evaluated. The results are shown in Table 1. In Table 1, if the presence of human sebum could not be visually confirmed, it was rated as "Good". If the outline of human sebum was barely visually confirmed, it was rated as "Acceptable". If the presence of human sebum residue was confirmed, it was rated as "Fail".

TABLE 1

| | Location 1 | Location 2 | Location 3 | Location 4 | Location 5 | Total Evaluation |
|---|---|---|---|---|---|---|
| Example 1 | Good | Good | Acceptable | Good | Good | Good |
| Example 2 | Acceptable | Acceptable | Good | Acceptable | Good | Good |
| Example 3 | Acceptable | Good | Acceptable | Good | Good | Good |
| Comparative Example 1 | Acceptable | Fail | Fail | Fail | Acceptable | Fail |
| Comparative Example 2 | Fail | Good | Acceptable | Good | Acceptable | Fail |
| Comparative Example 3 | Acceptable | Acceptable | Fail | Good | Fail | Fail |

For example, comparing the results of Example 1, Example 2, Comparative Example 1 and Comparative Example 2, it was discovered that the higher the area ratio of the prominent convex protrusions, the better the optical performance. Similarly, the same trend could be observed in comparing the results of Example 3, Comparative Example 1 and Comparative Example 3.

In contrast, too high an area ratio of the prominent convex protrusions is not preferable from the viewpoint of antifouling performance, as shown in Comparative Example 2 and Comparative Example 3. It is considered that the frequency of the contact between the stain and the apexes of the prominent convex protrusions increases if the area ratio of the prominent convex protrusions is too high. For the case in which there is no convexity as in Comparative Example 1, it is considered that the stain is difficult to be removed because the whole standard surface of the concavities is in contact with the stain.

REFERENCE SIGNS LIST

1 Optical element
2 First coating layer
3 Second coating layer
10, 11 Optical composite element
h1 to hn Concavity
d1 to dn Convexity
t1 to tn Central Point
$C_1$ to $C_n$ Area

The invention claimed is:

1. An optical element comprising a plurality of concavities arranged at a modal pitch not greater than a wavelength of light under a usage environment on one side of the optical element, wherein:

the optical element comprises two or more domains in a planar view, each of the domains comprising a predetermined arrangement of the plurality of concavities;

a plurality of prominent convex protrusions formed in at least one region selected from the group consisting of a region surrounded by a plurality of the domain and a region surrounded by the plurality of concavities in the domain; and an area ratio of the plurality of prominent convex protrusions in a planar view is from 1% to 15%, wherein the plurality of prominent convex protrusions has a height not less than a standard deviation 1σ of depths of the concavities from a reference plane, and protrudes from the reference plane at respective positions in an opposite side to the concavities with regard to the reference plane, the reference plane is a plane that is parallel to a basis plane obtained by slope correction in atomic force microscope (AFM) data and a plane at a position of modal surface height of the concavities obtained in AFM data, the position of modal surface height is measured from a modal local height of highest points of the prominent convex protrusions, the modal local height is obtained by histogramming a position information of a local height of a highest point of a convexity between the two concavities measured at 25 points from AFM data, and fitting a histogram data with a Gaussian function, and the area ratio of the plurality of prominent convex protrusions is an area ratio of the prominent convex protrusions to a whole surface at the reference plane, and is calculated from an AFM image which is obtained for a square region of which one side thereof is from 30 to 40 times the modal pitch.

2. The optical element according to claim 1, wherein a modal height of the plurality of prominent convex protrusions is not less than 0.2 times and not greater than 0.8 times a modal depth of the plurality of concavities.

3. The optical element according to claim 1, wherein a number of concavities adjacent to any of the plurality of prominent convex protrusions is not less than 10% and not greater than 80% of a total number of the plurality of concavities.

4. The optical element according to claim 1, wherein the plurality of prominent convex protrusions comprise a merged prominence, the prominent convex protrusions adjacent to each other being partially merged together.

5. The optical element according to claim 1, wherein the domain is arranged randomly in a planar view.

6. An optical composite element comprising the optical element according to claim 1, and a first coating layer on a side of the optical element on which the plurality of concavities and the plurality of prominent convex protrusions are formed, the first coating layer emulating a morphology of the plurality of concavities and the plurality of prominent convex protrusions.

7. An optical composite element comprising the optical element according to claim 1, and a second coating layer on a side of the optical element on which the plurality of concavities and the plurality of prominent convex protrusions are formed, the second coating layer covering a whole morphology of the plurality of concavities and the plurality of prominent convex protrusions.

8. An optical composite element comprising the optical element according to claim 1, and a protective film in contact with the plurality of prominent convex protrusions, on a side of the optical element on which the plurality of concavities and the plurality of prominent convex protrusions are formed.

9. An optical composite element, comprising the optical composite element according to claim 6 and a protective film in contact with a part covering the prominent convex protrusions in the first coating layer of the optical composite element.

10. The optical element according to claim 1, wherein the prominent convex protrusions are randomly present over a whole surface of the optical element.

* * * * *